Figure 1:
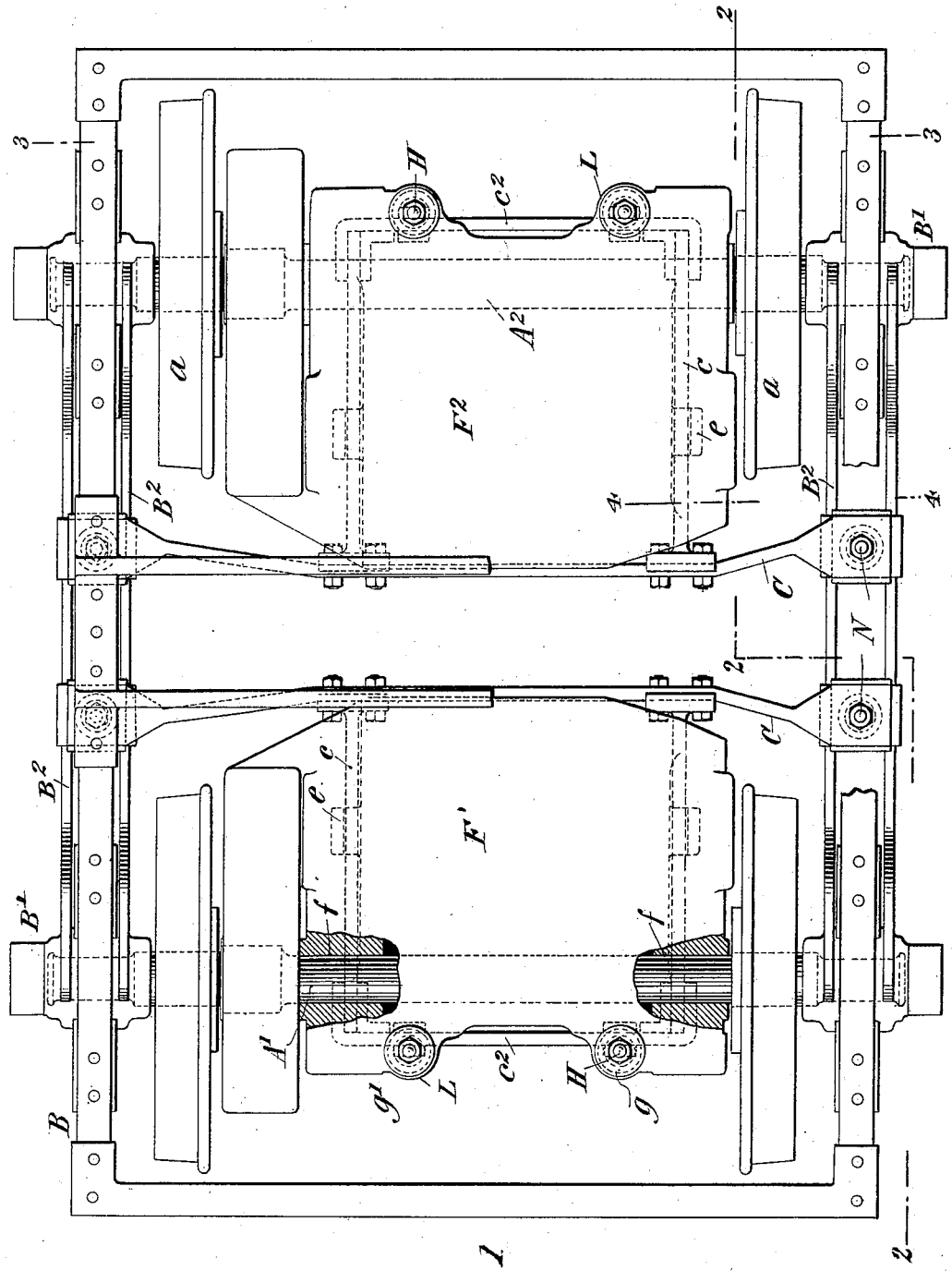

No. 620,239. Patented Feb. 28, 1899.
G. GIBBS.
ELECTRIC MOTOR SUSPENSION.
(Application filed Feb. 28, 1898.)
(No Model.) 2 Sheets—Sheet 1.

No. 620,239. Patented Feb. 28, 1899.
G. GIBBS.
ELECTRIC MOTOR SUSPENSION.
(Application filed Feb. 28, 1898.)
(No Model.) 2 Sheets—Sheet 2.
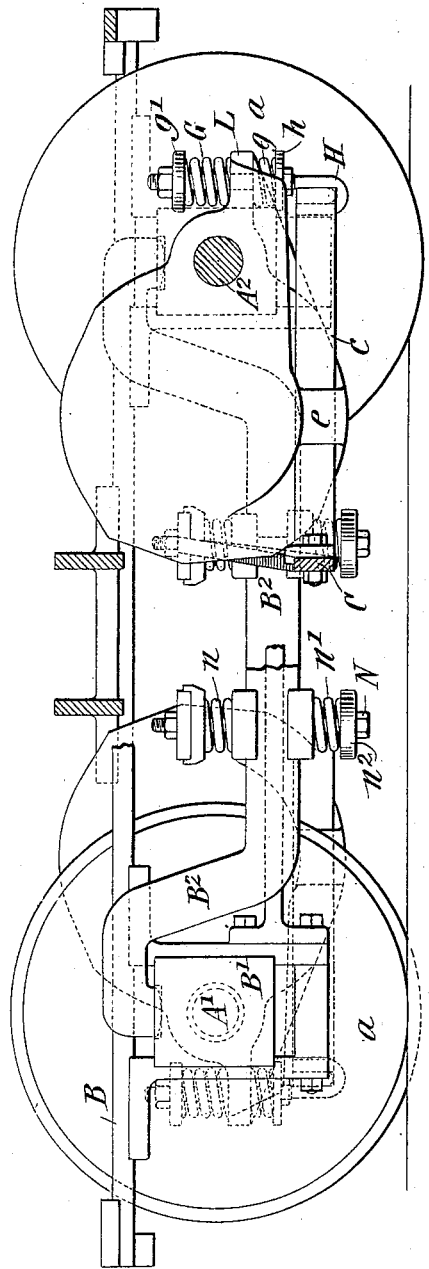
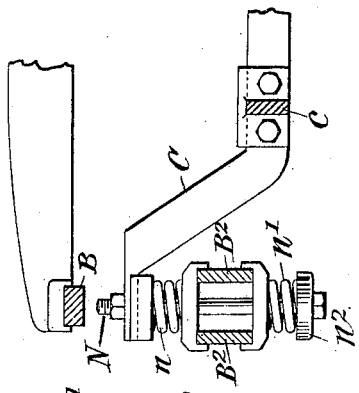
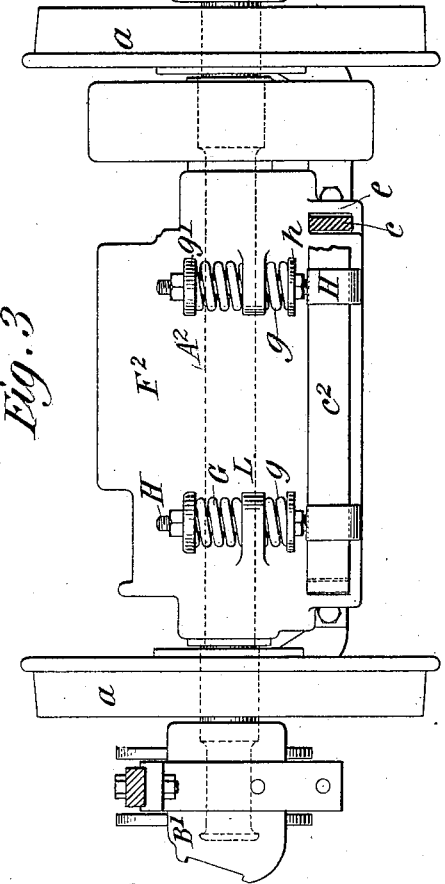
Witnesses:
Raphaël Netter
James H. Jones
George Gibbs Inventor
by Charles M. Terry Atty.

UNITED STATES PATENT OFFICE.

GEORGE GIBBS, OF PHILADELPHIA, PENNSYLVANIA.

ELECTRIC-MOTOR SUSPENSION.

SPECIFICATION forming part of Letters Patent No. 620,239, dated February 28, 1899.

Application filed February 28, 1898. Serial No. 672,012. (No model.)

*To all whom it may concern:*

Be it known that I, GEORGE GIBBS, a citizen of the United States of America, and a resident of Philadelphia, in the county of Philadelphia and State of Pennsylvania, have invented certain new and useful Improvements in Electric-Motor Suspension, of which the following is a specification.

My invention relates to certain improvements in the suspension of electric motors employed for propelling vehicles.

The object of the invention is to provide a convenient form of motor suspension which will relieve the trucks from undue strain and at the same time support the motors in such a manner that the propelling power may be applied to the car-axles without causing undue strain upon any part of the structure and will not interfere with the easy riding of the vehicle.

My invention will be described in detail in connection with the accompanying drawings, in which—

Figure 1 is a plan of a car-truck and the motors. Fig. 2 is a side elevation of the same. Fig. 3 is an end elevation, and Fig. 4 is a detail.

Referring to the figures, $A'$ and $A^2$ represent the two axles of the truck, and B represents the truck-frame. These parts are of the usual construction. The car-wheels are represented at $a$. The truck-frame is supported upon the axles through boxes $B'$ in the usual manner. Equalizing-bars $B^2$, of well-known construction, rest upon the axles at their respective ends.

The motors $F'$ and $F^2$ may be of any well-known construction, and they are sleeved at $ff$ upon the respective axles $A'$ and $A^2$, the field-magnets extending, as shown, toward each other and being located between the axles. The field-magnets rest upon bars $c$, which pass through suitable sleeves or lugs $e$ in the field-magnets of the motors or their casings, or they may be pinned thereto. These bars $c$ are carried in the following manner: The outer end is carried by a bar or hanger H, which in turn is supported by a spring G, resting upon a lug or extension L, formed upon the end of the motor-frame or otherwise attached thereto. The spring G is placed between a collar $g'$ at the upper end of the hanger and the extension or lug L. A similar spring $g$ surrounds the hanger and is placed between the extension L and a collar $h$ upon the hanger below the extension. The inner end of each bar $c$ is secured to a cross suspension-bar C, the ends of which are carried upon the equalizing-bars $B^2$. The cross-bars C may be spring-supported with reference to the equalizing-bars, and for this purpose rods or bolts N are shown as extending through these bars, springs $n$ and $n'$ being placed, respectively, between the upper side of the equalizing-bar and the end of the cross-bar C and between the lower side of the equalizing-bar and a collar $n^2$ upon the lower end of the rod N. The four bars $c$ are all supported in the manner described.

It will be observed that the principal weight of the motors is carried directly by the axle, and each is permitted to turn upon the axle more or less, and, further, that any motion or jolting is taken up by the several springs without communicating it to the car-body, any jolts which may be communicated to the equalizing-bars being almost entirely absorbed by the intervening springs. For the purpose of securing more rigid construction the outer ends of the bars $c$ may be connected with each other by means of bars $c^2$. This construction permits of the use of either one or more motors upon a truck.

I claim as my invention—

1. A supporting-frame for an electric motor of an electric vehicle consisting of a frame, spring-supported at one end from the axle, and spring-supported at the other end upon the opposite side of the axle upon the equalizing-bars of the truck.

2. The combination of an electric motor sleeved upon the axle of a car, a frame spring-supported from the motor-frame upon one side of the car-axle and spring-supported upon the other side of the car-axle by the equalizing-bars of the truck.

3. The combination with a car-truck of an electric motor sleeved upon an axle of the truck and having its field-magnet between the axles, and a carrying-frame for the motor supported at one end upon the equalizing-bars and at the other upon extensions of the motor at the outside of the axles.

4. The combination with a car-axle of an electric motor sleeved thereon, an extension of the frame of the motor upon the side axle opposite the field-magnet, a frame spring-supported at one end from said extension and spring-supported at the other end from the equalizing-bars of the truck, which frame receives the field-magnet of the motor.

Signed by me, at New York city, this 26th day of February, 1898.

GEORGE GIBBS.

Witnesses:
CHARLES A. TERRY,
J. H. JONES.